Figure 1:
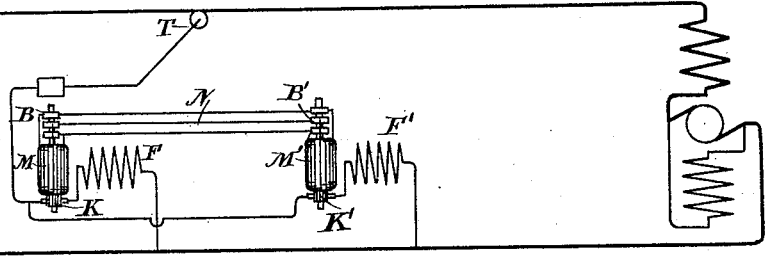

(No Model.) 2 Sheets—Sheet 1.

E. THOMSON & E. W. RICE, Jr.
MEANS FOR SYNCHRONIZING ELECTRIC MOTORS.

No. 545,111. Patented Aug. 27, 1895.

WITNESSES
Alec F. Macdonald.
J. J. Johnston.

INVENTORS
Elihu Thomson and
Edwin W. Rice Jr. by
Bentley and Blodgett
att'ys.

(No Model.) 2 Sheets—Sheet 2.

E. THOMSON & E. W. RICE, Jr.
MEANS FOR SYNCHRONIZING ELECTRIC MOTORS.

No. 545,111. Patented Aug. 27, 1895.

WITNESSES.
Alec F. Macdonald.
T. J. Johnston.

INVENTORS
Elihu Thomson and
Edwin W. Rice, Jr.
by Bentley and Blodgett
Attys.

UNITED STATES PATENT OFFICE.

ELIHU THOMSON AND EDWIN W. RICE, JR., OF SWAMPSCOTT, ASSIGNORS TO THE GENERAL ELECTRIC COMPANY, OF BOSTON, MASSACHUSETTS.

MEANS FOR SYNCHRONIZING ELECTRIC MOTORS.

SPECIFICATION forming part of Letters Patent No. 545,111, dated August 27, 1895.

Application filed March 8, 1893. Serial No. 465,083. (No model.)

*To all whom it may concern:*

Be it known that we, ELIHU THOMSON and EDWIN W. RICE, Jr., both of Swampscott, in the county of Essex and State of Massachusetts, have invented certain new and useful Improvements in Means for Synchronizing Electrical Machines, of which the following is a specification.

Our invention relates to means for compelling electrical machines such as dynamo-electric machines and motors to run in unison, and has for its object to provide electrical means for synchronizing the rotation of armatures in such apparatus in contradistinction to mechanical means for effecting the same end, the action of electricity being practically instantaneous, and therefore readily responsive to changes of load or speed.

In this specification we have illustrated our invention as applied particularly to motors, and more specifically to such motors employed in street-railway work; but as we wish it understood that our invention may readily be adapted to dynamo-electric machines generally we claim broadly an electrical means for compelling continuous-current armatures to rotate in unison by whatsoever method this result may be accomplished, provided it be an electrical method as distinct from a mechanical.

In the accompanying drawings hereby referred to and made a part of this specification, which show an embodiment of our invention, like letters refer to like parts.

Figures 1, 2, 4, 6, and 8 illustrate diagrammatically methods of employing our invention identical in principle though varying slightly in form. Figs. 3 and 7 show two methods of employing a controlling apparatus in connection with our invention, while Fig. 5 shows diagrammatically an armature suitable for its employment with proper connections.

It will be observed in the operation of street-railways that owing to unequal load at two ends of the car or the condition of the track the wheels at one end may slip, while the wheels at the other, having firm adhesion, drive the car. In this case one of the motors will "race," and because the motors are in series the current will be cut down by counter-electromotive force, so that the single motor becomes unable to drive the car, and if the slipping be prolonged the car may even come to a stop. It has sometimes been deemed advisable to connect the motors mechanically by connecting rods or gearing; but all such arrangements are noisy, require oiling and other attention, and, owing to the necessity of supporting the motors by some spring connection and the consequent looseness of parts, become sources of lost power, which increase with wear. When cars having radiating axles are used, as in the long cars often employed for heavy traffic, the mechanical difficulties are much increased. Our invention aims to overcome such difficulties by doing away with the mechanical connection and providing an electrical one in lieu thereof, as more specifically described herein.

In Fig. 1, M is a motor suitably geared to one axle of a vehicle, and M' is a similar armature geared to another axle, both motors being supplied with current through the trolley T, which is regulated by a suitable controlling device, as shown in Fig. 1. The motor-armatures and field-coils (designated by F F') are arranged in parallel or multiple arc. The motor-armatures M are of the Siemens drum or Gramme ring type, and have a continuous winding connected at intervals to the commutators. Connections from this winding are taken to collector-rings B, mounted on the same shaft from which polyphase currents are taken. One form of motor-armature is of the type illustrated in Fig. 5, where W' is a continuous winding connected at each coil to a segment of the commutator K in the usual manner and adapted to generate or receive continuous current. W is a continuous winding wound on the same core with the continuous current-winding W', but insulated therefrom. This winding is adapted to generate or receive current, and three leads one hundred and twenty degrees apart are run therefrom to collector-rings B mounted on the shaft of the armature, from which currents differing one hundred and twenty degrees in phase are taken. Between the collecting-rings B B' are run lead-wires N, one for each pair of rings, forming a three-phase or multiphase connection for the two motors operating as hereinafter described, In Fig. 2 we have shown a different arrangement identical in principle, although slightly different in construction. In this case the field-coils F F' are arranged in series with the armature M, which is wound as above described; but the coils of the armature M' are provided with multiphase connections only, taking current from the armature M as a generator and being driven by it, its magnetic field being supplied by the continuous current in the coil F'.

In Fig. 3 we have shown our invention as applied to a car or other apparatus provided with what is known in the art as a "series parallel controller." In this case it is manifest that as the armatures M M' and the field-coils F F' may be coupled up, either directly or with resistance in series, in many ways well known to those skilled in the art, and therefore not described herein, armatures connected as we have described cannot be employed. We therefore wind two armatures upon the same shaft. For this purpose we may either arrange two windings upon one core, as illustrated in Fig. 5, or we may arrange two separate armatures upon different cores on the same shaft, one of them adapted to continuous currents and the other to a multiphase system, connecting the collecting-rings of the multiphase-armatures as in previous cases and revolving the armatures under the influence of the same or different field-magnets.

Figure 2:
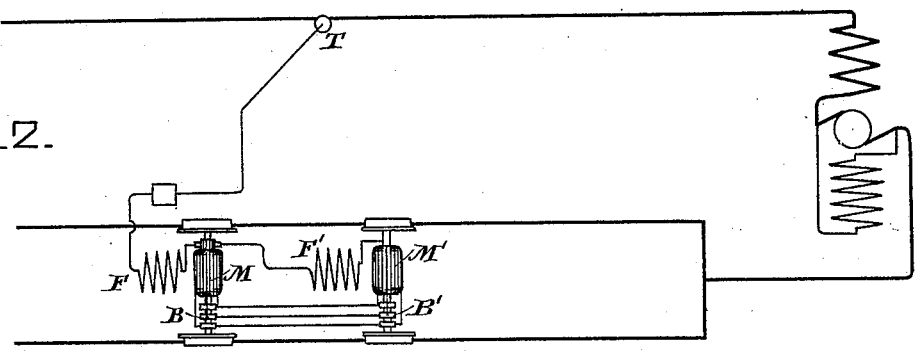
Figure 3:
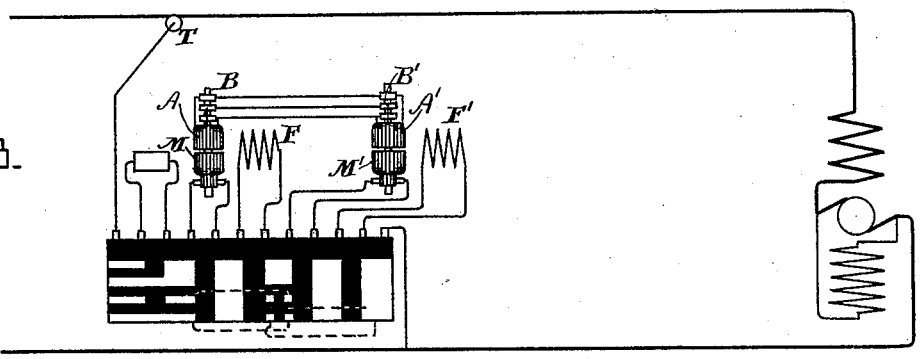
Figure 4:
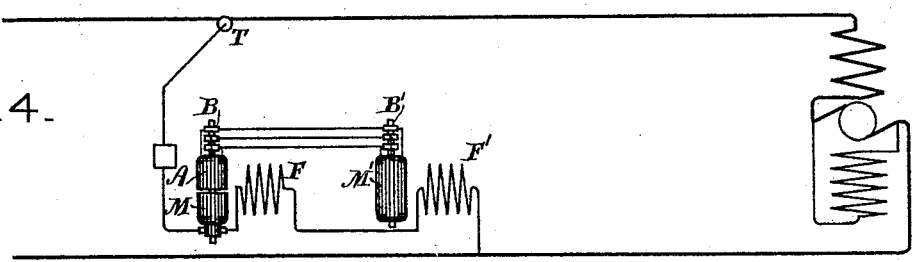
Figure 5:
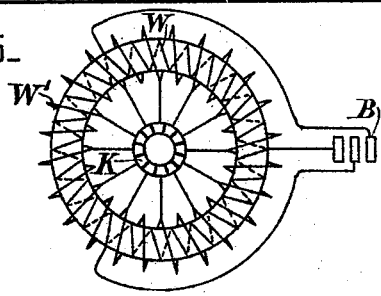

In Fig. 4 a modification of the arrangement shown in Fig. 2 is presented, in which an armature M, adapted to continuous currents, is arranged on a shaft with a second armature A, adapted to generate three-phase currents, both armatures being energized by the same field-coil F. The second armature M' is adapted only to the three-phase current, and is energized by the field-coil F' in series with the field-coil F', the collecting-rings of the three-phase armatures being connected as before. Two separate windings may be put on the same core, as before described, either side by side or one superposed upon the other.

Figure 6:
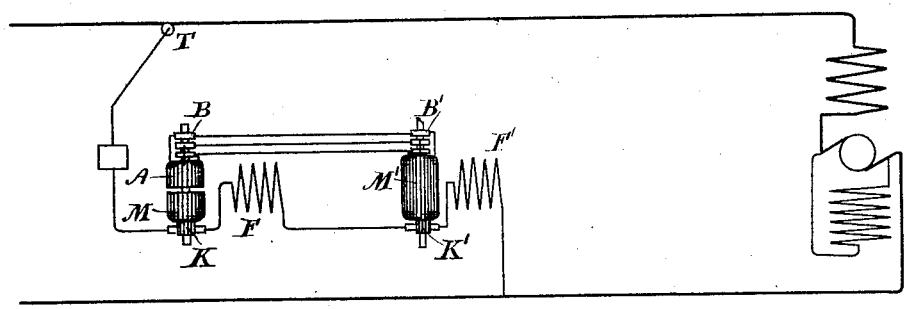
Figure 7:
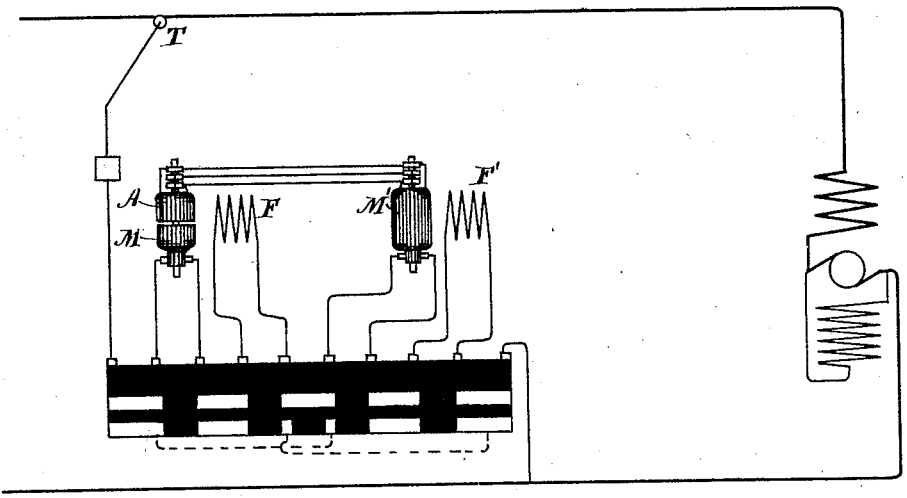

In Fig. 6 a further modification is illustrated, somewhat similar to that shown in Fig. 4. In this figure two armatures M and A are arranged upon the same shaft or two windings placed upon the same core in the same manner, as illustrated and described in connection with Fig. 4. The second armature M' is, however, adapted to continuous currents, and is provided with a commutator K' and other connections to collecting-rings B' in a three-phase system, as explained with reference to Fig. 5, the field-coils F and F' being arranged in series and energized by the continuous current.

In Fig. 7 we have illustrated the application of a controller to such an arrangement of armatures as is shown in Fig. 6, this controller being adapted to connect only the armatures in series or in multiple arc, as may be desired, in ways well known in the art. It should be understood that where controlling mechanism is used to change continuous-current-armature connections from series to multiple the counter-electromotive forces of the winding should be made to balance at the time of connection in multiple, or at least to nearly balance, so as to equalize the torque of the two armatures as nearly as may be possible. While this is not absolutely necessary, it is desirable and may be readily attained.

Figure 8:
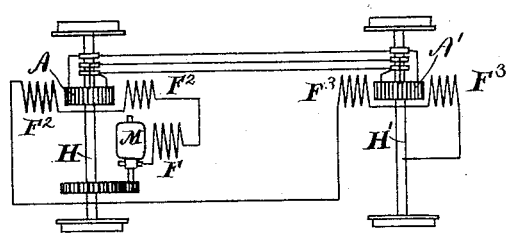

Fig. 8 shows an arrangement especially adapted to street-cars or other vehicles. In this figure the armature M of a continuous-current motor is geared to an axle H. Upon this axle H is placed directly a second armature A, energized by field-coils $F^2$ $F^2$ in series with the field-coil F, energizing the armature M. Upon the second axle H' is placed another armature A', furnished with field by the coils $F^3$ $F^3$, also in series with the other field-coils. These armatures A and A' are wound on the multiphase system only, and are connected by collecting-rings and leads, as in the other cases. Such an arrangement is particularly adapted to the high-power locomotives required in trunk-line business, as two, three, or even more motors may be employed without mechanical connections between the driving-wheels, the armatures insuring unison of action and equal distribution of strain over the framing of such high-power machines. It is manifest that reduction-gears may be introduced into such a device, or the motors might be located on different parts of the train and their synchronism maintained, as herein described, without departing from our invention.

The operation of the devices herein set out is as follows: The continuous-current winding or armature is driven, in the case of a generator, by the source of power in a motor by the line-current, and acts also as a generator of multiphase currents through the collecting-rings and leads. So long as the speed of the two armatures A A' is the same the two electromotive forces in the multiphase system balance and no current passes; but should one increase in speed a difference of electromotive force is produced, and one machine generates a current driving the other as a motor, tending to maintain synchronism of rotation. At the same time the loss of energy in the driving-armature acts as a brake to slow it down until the opposing forces again balance and the two armatures revolve at the same speed. The greater the difference in speed the higher the opposing force, and as the effects herein set out are practically instantaneous and the resistance of the leads and armatures comparatively small unison of revolution is secured. In those modifications which show one armature provided only with multiphase windings the other divided or compound-wound armature acts to drive it in a well-known way, the increase of load on the driving-armature slowing it down, causing it to generate less current and thus slow the driven armature.

It is manifest that the same principles herein set out as applicable to a pair of motors and generators may be further extended and applied to three or more co-operating machines. It is further manifest that many other changes and modifications may be made which will come within the scope of our invention. Therefore we wish to be understood as claiming, broadly, any adaptation of electric synchronizing means to continuous-current dynamo-electric armatures. We consider any undulatory current, and particularly an alternating current, an equivalent for the multiphase current, the application of which we have illustrated, and the principle of our invention is the utilization of phasal or pulsating currents of any kind in continuous-current dynamo-electric machines whose armature-windings are adapted to such currents for the purpose of synchronizing the rotation of the armatures.

What we claim, and wish to protect by Letters Patent of the United States, is—

1. In a power system, a continuous current generator, a circuit extended therefrom, a plurality of motors having field coils and armatures with continuous current windings adapted to receive the generated current, and multiphase connections taken from said windings; in combination with a circuit controller, whereby the speed of both armatures may be varied simultaneously, and independent of the multiphase apparatus.

2. In an electric railway system, the combination of a continuous current main, a vehicle making traveling contact therewith, a plurality of armatures mounted on the vehicle adapted for continuous current, connections taken from these armatures to rings, at points giving three-phase currents, mains connecting the rings between the several armatures and thereby synchronizing their rotation.

3. As a means of effecting synchronous rotation of a plurality of armatures, rotating in magnetic fields and included in the supply circuit from a generator, a continuous winding on such armatures connected at each coil to a commutator segment and at equal segmental distances to separate collecting rings, one ring for each segment of the total winding, with mains between the collecting rings on the several armatures forming a phasal connection between them; whereby a change of speed in one armature creates a difference of potential in the phasal system, and alternating electro-motive force is transmitted to the armature having the slower speed, causing its acceleration, thus synchronizing their speed.

4. In a power system, the combination of a generator, a circuit extending therefrom, a plurality of motors with single continuous current windings on the armatures connected to collector rings and a commutator, connections between like parts of the motors, those between the commutators transmitting continuous current at all times in one direction, those between the collector rings transmitting polyphase currents from the armature revolving at the higher speed to the one revolving at a lower speed, and a controller for changing the speed of all the motors independent of the connections between the collector rings.

5. The combination in a power circuit of a plurality of motor armatures provided with collector rings and commutators, and fields deriving their current from a common source of continuous current, a controller for regulating the speed of the armatures simultaneously, three-phase mains connecting the collector rings of the several motors and transmitting current from the armature or armatures revolving at the greater speed to those revolving at a lower speed, these mains being independent of any outside source.

6. In a power system, the combination of a plurality of continuous current motor armatures having windings connected to both collector rings and commutator segments, receiving continuous current from an external source and rotated thereby, mains independent of any outside source connecting the collector rings and transmitting current when the speed of the armatures is different.

In testimony whereof we have hereunto set our hands this 4th day of March, 1893.

ELIHU THOMSON.
EDWIN W. RICE, JR.

Witnesses:
JOHN W. GIBBONEY,
WALTER C. FISH.